Figure 1:
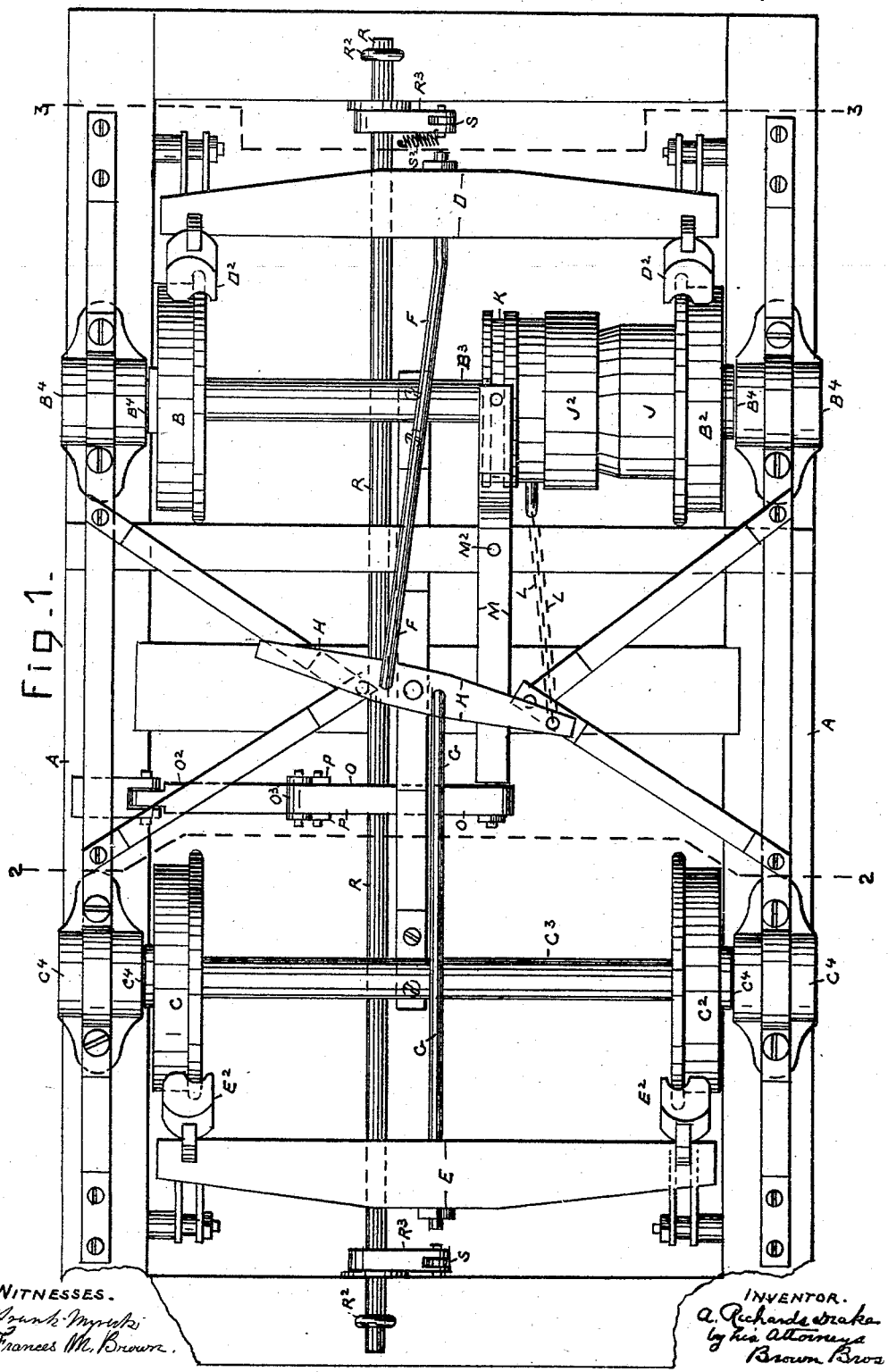

(No Model.) 2 Sheets—Sheet 1.

A. R. DRAKE.
CAR BRAKE.

No. 439,837. Patented Nov. 4, 1890.

WITNESSES.
Frank Myrick
Frances M. Brown

INVENTOR.
A. Richards Drake
by his Attorneys
Brown Bros.

(No Model.) 2 Sheets—Sheet 2.

A. R. DRAKE.
CAR BRAKE.

No. 439,837. Patented Nov. 4, 1890.

WITNESSES.
Frank Myrick
Francis M. Brown

INVENTOR.
A. Richards Drake
by his attorneys
Brown Bros.

UNITED STATES PATENT OFFICE.

ALBERT RICHARDS DRAKE, OF WALTHAM, MASSACHUSETTS.

CAR-BRAKE.

SPECIFICATION forming part of Letters Patent No. 439,837, dated November 4, 1890.

Application filed February 24, 1890. Serial No. 341,546. (No model.)

*To all whom it may concern:*

Be it known that I, ALBERT RICHARDS DRAKE, a citizen of the United States of America, and a resident of the city of Waltham, in the county of Middlesex and State of Massachusetts, have invented certain new and useful Improvements in Brakes for Street-Railway and other Cars, &c., of which the following is a full, clear, and exact description.

This invention in railway-car brakes relates to mechanism for operating the ordinary or other suitable brake mechanism of a railway-car, preferably adapted to put on or take off the brake from either end of the car; and the mechanism of the invention, in substance and preferably, consists of a clutch in two parts, one of which is fixed and the other is adapted to slide on the axle of the car-wheels and together are adapted when engaged to rotate in unison with the axle, and when disengaged to allow the axle to rotate within the sliding part of the clutch; a chain or other suitable flexible line, which at one end is attached to and is adapted to be wound on and unwound from the sliding part of the clutch according as it is rotated in either one or the other direction, and at the other end is attached to a horizontal lever that extends transversely of and is fulcrumed on the car, and at opposite sides of its fulcrum is connected to the brake-beams of the brake mechanism before referred to at opposite ends of the car, and is arranged so that moved in one direction to put on and in the other direction to take off the brakes; a lever which extends lengthwise of and is fulcrumed on the car and at one end portion is adapted to engage and suitably operated to move the sliding part of the clutch into and out of engagement with its part fixed on the axle, and at all times when the sliding and fixed parts of the clutch are engaged to allow said part to rotate, and appliances consisting, essentially, of a toggle-lever, which extends transversely of and has the outer end of one of its arms jointed on the car and the outer end of the other of its arms jointed to the end of said operating-lever for the clutch that is opposite to the end engaged with the clutch, as stated, and of mechanism which is connected with the toggle-lever and is held on and at opposite ends of the car is adapted to be operated to work said toggle-lever in opposite directions and acting through the lever jointed to it and connected to the sliding part of the clutch, as has been stated, in the one direction to move the sliding part of the clutch into and enable it to be maintained in engagement with the part of the clutch fixed on the axle and in the other direction to move the sliding part of the clutch out of engagement with the fixed part of the clutch, and thereby, in the first instance, to secure the putting on and in the second instance the taking off of the brakes, all substantially as hereinafter appears.

Figure 2:
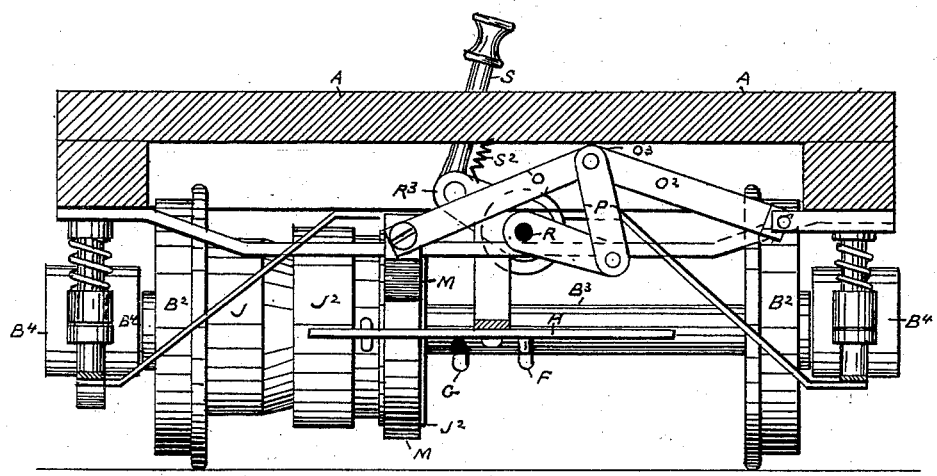
Figure 3:
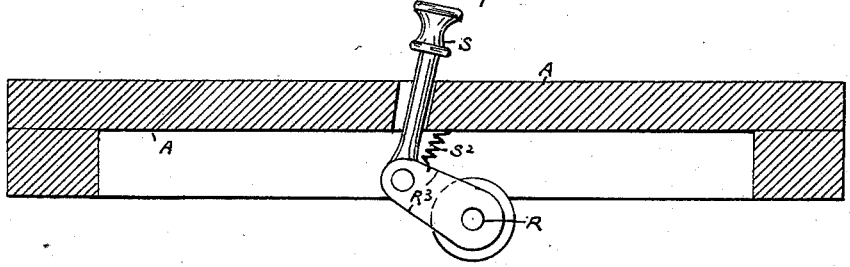
Figure 4:
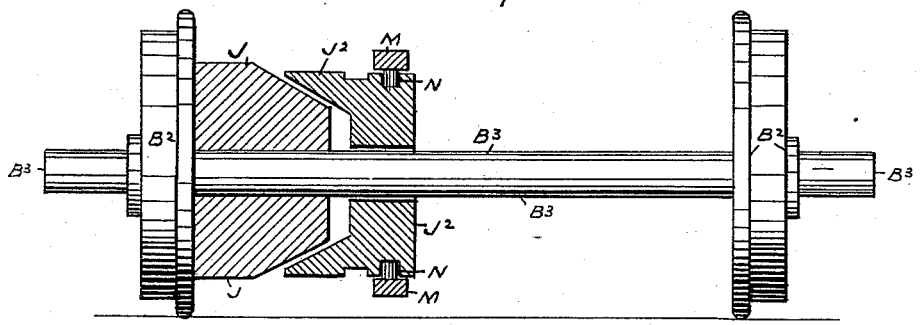

In the drawings forming part of this specification, Figure 1 is a plan view of the under side of a car, showing an ordinary brake mechanism of the character before referred to and the appliances of this invention severally in their normal position for operating said brake mechanism. Figs. 2 and 3 are transverse vertical sections, lines 2 2 and 3 3, respectively, Fig. 1. Fig. 4 is a detail vertical sectional view of the two parts of the clutch and an elevation of an axle to which they are applied and of the wheels of said axle.

In the drawings, A represents a car; B B$^2$ and C C$^2$, pairs of car-wheels at opposite end portions of the car, and those of each pair having a common axle B$^3$ C$^3$, respectively, and each axle is arranged to turn at its opposite end portions in an axle-box B$^4$ C$^4$, respectively.

D E are brake-beams, each at its opposite end portions having brake-shoes D$^2$ E$^2$, respectively, and both held on the car and arranged when suitably moved for the brake-shoes of the one brake-beam D to bear on the pair of car-wheels B B$^2$ and of the other brake-beam E to bear on the pair of car-wheels C C$^2$.

F G are rods, each at one end fastened to the brake-beam D E, respectively, and at the other end held on a common lever H, extending transversely of and fulcrumed on the car one at one and the other at the other side of said fulcrum. This lever H, moved in one direction, secures the simultaneous putting on and in the other direction the simultaneous taking off of both pairs of brake-shoes from their respective pairs of car-wheels.

So far as described, all is as ordinary, and forms in none of its parts, either alone or in any of its combinations and arrangements, any part of this invention, and while shown in the drawings and herein described, it is to be distinctly understood that the mechanism of this invention, to be now particularly described, is to be in no manner limited thereto or to any other special form of brake-operating mechanism.

$J J^2$ is a two-part clutch, which is held on the wheel-axle $B^3$ of the car and has its part J fixed, and its part $J^2$ loose and free to slide on the axle and the axle free to turn in it, and the two together are constructed and arranged, as particularly shown, the sliding part to lap over the fixed part and move in one direction to make frictional, as shown, or other suitable contact, and in the other direction to be out of contact with the fixed part. Both parts of the clutch are cylindrical, and the portions $J^3 J^4$, respectively, of each for contact is correspondingly tapered, and the sliding part has a groove K that extends around it. At one side of the groove K of the clutch is a chain L at one end held on it, and at its other end held on the lever H of the brake mechanism hereinbefore referred to.

M is a lever that extends lengthwise of the car and at one end portion partially surrounds the sliding part of the clutch at its said grooved portion, and N N are pins at opposite sides of the lever which engage said groove of the clutch, all so as to allow the sliding part of the clutch to freely rotate without interference of said lever. The lever M is fulcrumed at $M^2$ on the car and at its end opposite to its end portion engaged with the groove of the clutch. As explained, it is pivoted to the outer end of one arm O of a toggle-lever $O O^2$, jointed at the outer end of its opposite arm $O^2$ on the car, and said two arms of the toggle-lever are jointed end to end, as at $O^3$.

P is a link, at one end jointed to the jointed ends of the toggle-lever and at the other end to the outer end of a crank-arm Q, held on a rod or shaft R, extending longitudinally and horizontally from end to end under and turning in suitable bearings $R^2$ of the car. This shaft R at each of its opposite ends has a crank-arm $R^3$ fixed on it, and each crank-arm at its outer end has a vertical handle S jointed to it. Each handle-rod S passes upward through and is projected above the bottom or platform or floor of the car in convenient position for being handled in any suitable manner, so as thereby to rotate or rock the shaft R, with which it is connected, as explained, in its bearings of the car. The rocking of the shaft R in one direction straightens out and in the other direction closes the arms of the toggle-lever, and in the first instance it thereby moves the lever M in engagement with the sliding part of the clutch, as described, in a direction to place said part into engagement, and in the second instance it thereby moves said lever M in a direction to place the sliding part of the clutch out of engagement with the part of the clutch fixed on the axle.

With the parts of the clutch engaged, as explained, on then rotating the axle to which the clutch is applied, both parts of the clutch are rotated in unison with the axle, securing a winding of the chain about the clutch and consequently a putting on of the brakes, and with the parts of the clutch disengaged, as explained, the brakes are taken off and the axle carrying the clutch and its wheels are left free to rotate, all as may be desired.

$S^2$ is a spiral spring suitably secured to shaft R and car A, to secure the automatic return of shaft and other parts to their normal position.

Having thus described my invention, what I claim, and desire to secure by Letters Patent, is—

1. The combination, with a railway-car-brake mechanism adapted to have its brake put on and taken off of the wheels of the car, of a two-part clutch held on an axle of the car and adapted to be engaged with and disengaged from each other and engaged to rotate in unison with the axle, and disengaged to allow the axle to rotate independently thereof, a chain or other flexible line at one end held on said clutch to be wound thereon only when engaged, and at the other end held on a lever of said car-brake mechanism, a lever fulcrumed on the car and in engagement with said clutch to place its parts into and out of engagement and to allow of the rotation of the clutch when its parts are engaged, and appliances consisting of a toggle-lever having one arm jointed on the car and the other jointed on the clutch-operating lever, and means in connection with and adapted to operate said toggle-lever, substantially as described, and for the purpose specified.

2. The combination, with a railway-car-brake mechanism adapted to have its brakes put on and taken off of the wheels of the car, of a two-part clutch held on an axle of the car and adapted to be engaged with and disengaged from each other, and engaged to rotate in unison with the axle and disengaged to allow the axle to rotate independently thereof, a chain or other flexible line at one end held on said clutch to be wound thereon only when engaged and at the other end held on a lever of said car-brake mechanism, a lever fulcrumed on the car and in engagement with said clutch to place its parts into and out of engagement and to allow of the rotation of the clutch when its parts are engaged, and appliances consisting of a toggle-lever having one arm jointed on the clutch-operating lever, a link P, jointed to both arms of the toggle-lever, and a horizontal shaft R in connection by crank-arm R³ with said link and adapted to be rotated, substantially as described, and for the purpose specified.

In testimony whereof I have hereunto set my hand in the presence of two subscribing witnesses.

A. RICHARDS DRAKE.

Witnesses:
ALBERT W. BROWN,
GEO. C. BENT.